(No Model.)
P. J. BROWN.
PERCOLATOR STAND.
No. 577,829. Patented Feb. 23, 1897.
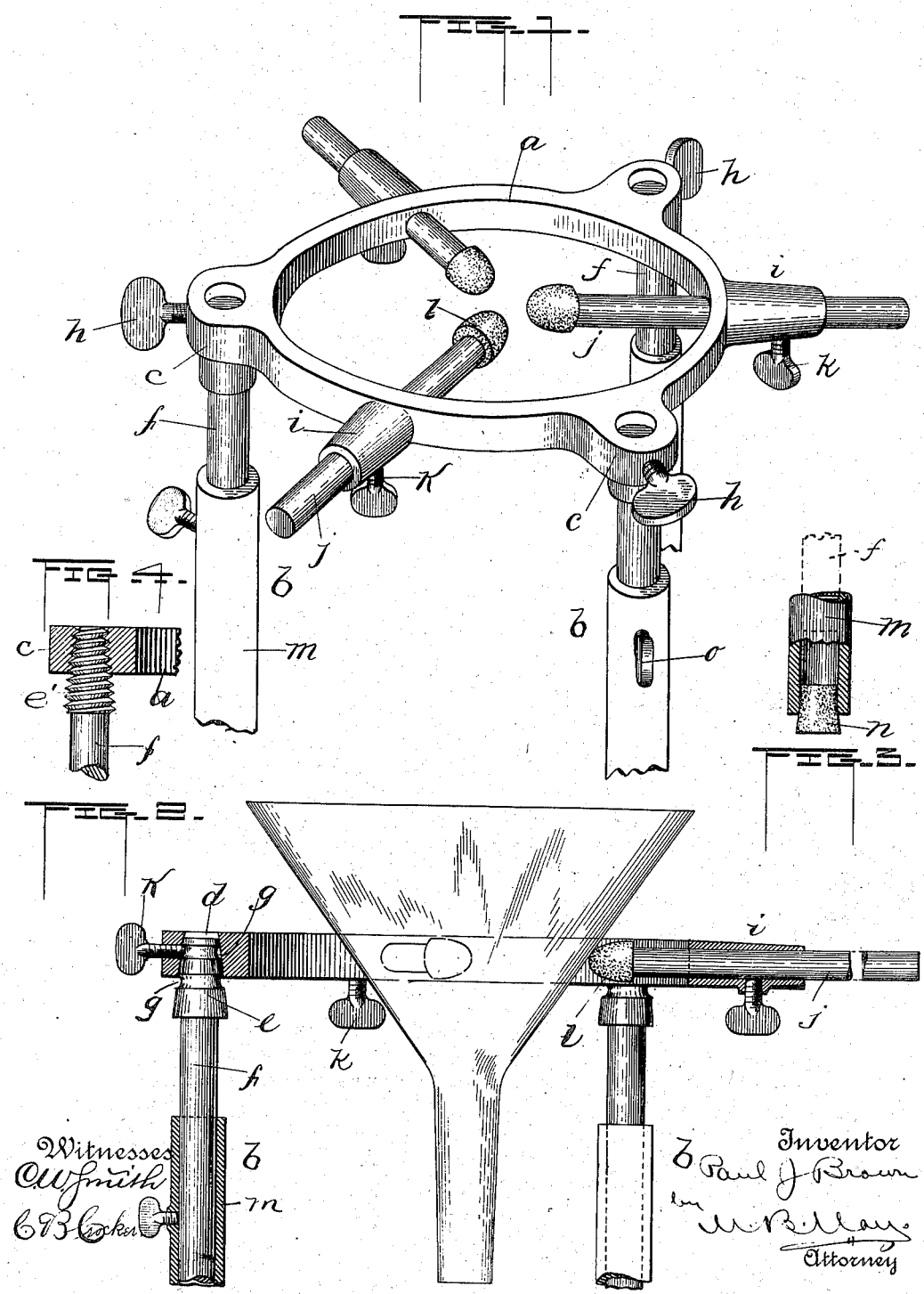

UNITED STATES PATENT OFFICE.

PAUL J. BROWN, OF BOSTON, MASSACHUSETTS.

PERCOLATOR-STAND.

SPECIFICATION forming part of Letters Patent No. 577,829, dated February 23, 1897.

Application filed April 22, 1896. Serial No. 588,673. (No model.)

*To all whom it may concern:*

Be it known that I, PAUL J. BROWN, a citizen of the United States, residing at Boston, in the county of Suffolk and State of Massachusetts, have invented certain new and useful Improvements in Stands for Percolators, of which the following, taken in connection with the accompanying drawings, is a specification.

This invention has relation to stands or supports for supporting percolators, filters, funnels, and other receptacles or utensils used by chemists, druggists, or others in treating liquids or drawing liquid from chemical matter; and it consists of a device having those features of construction and arrangement which are illustrated upon the drawings and which I shall now proceed to describe in detail, and then point out in the claims hereto appended, reference being had to the accompanying drawings, upon which is portrayed one form of stand or support in which my invention is embodied.

Similar letters of reference indicate similar parts or features, as the case may be, wherever they occur.

Of the drawings, Figure 1 is a perspective view of a stand constructed in accordance with my invention, the lower ends of the standards or legs being broken off. Fig. 2 is a vertical cross-sectional view of the stand or support, in which a funnel is shown as supported. Fig. 3 illustrates in partial section the lower end of one of the legs or standards. Fig. 4 shows a different way for securing the standard in the supporting-ring.

Referring to the drawings, the stand or support pictured thereby consists of a tripod having a metallic ring $a$ and legs or standards $b$, of which latter there are preferably three.

The ring $a$ is provided with three radially and outwardly extending ears $c$, each of which has a vertical frusto-conical aperture $d$ to receive the frusto-conical head $e$ of a rod $f$, which forms a portion of a leg $b$. Each head $e$ has one or more circumferential grooves $g$ to receive the end of a set-screw $h$, threaded into the ear $c$ to hold the leg in place. By employing the frusto-conical head, fitting in the converging socket, the weight of the ring and the article supported thereby is not borne by the set-screw, but is sustained by the head itself, the set-screw being depended upon only for securing the leg firmly in place. The ring is also provided with radially-extending sleeves or bearings $i$, each arranged midway between two of the ears and in which I place a longitudinally-adjustable radial supporting-rod $j$. Each rod may be secured in any desired adjustment by a set-screw $k$, extending up into the sleeve from below, so as to be out of the way, and is also provided at its inner end with a rubber head or cushion $l$, secured thereto in any suitable way. The cushions are removable, so that when they become worn out they may be replaced by new ones.

The legs or standards $b$ are adjustable in length and consist of the rods or bars $f$, hereinbefore referred to, and the sleeves or tubes $m$. The sleeves $m$ are slightly longer than the rods or bars $f$, which may be of any suitable length, and have rubber or cork cushions or buffers $n$ inserted in their lower ends, as indicated by Figs. 1 and 3.

When the heads $e$ of the rods $f$ are inserted in their sockets and secured therein by the screws $h$, the ring $a$ may be elevated to any desired distance, the rods $f$ sliding in the tubes or sleeves $m$ for this purpose, and may be held at that height by set-screws $o$, threaded into the sleeves and bearing against the rods.

A stand constructed in accordance with my invention is possessed of numerous advantages. The ring $a$ may be of any desired or suitable diameter, so that by adjusting the radial supporting-rods $j$ any size or shape of percolator, funnel, or filter may be supported in the stand. In Fig. 2 I have illustrated a funnel as being held by the radial rods. The cushion tips or heads $l$ hold the glass, porcelain, or other receptacle or utensil firmly without danger of breaking or injuring it in any way.

The adjustability of the supporting-ring provides for the reception of a percolator or filter of any reasonable length and provides for maintaining it at any desired height.

The cushions in the ends of the legs or standards provide against the latter marring, scratching, or otherwise injuring the table or slab on which the stand is placed.

I have likewise contemplated securing the rods $f$ in place in other ways, as, for example, as shown in Fig. 4. In that figure the socket is threaded and the head $e'$ is also formed with threads, so that it may be screwed in place, thus dispensing with set-screws.

When it is desired to pack the stand for shipping or to store it away when not in use, the radial rods are removed from the ring, and the set-screws $h$ being loosened the legs are taken off, and the stand thus dismembered will occupy but small space.

It will be understood that I do not wish to be construed as in any way limiting myself to this particular embodiment of my invention, as many changes and modifications could be made in the same without departing from the spirit and scope of my invention.

Having thus explained the nature of the invention and described a way of constructing and using the same, though without attempting to set forth all of the forms in which it may be made or all of the modes of its use, it is declared that what is claimed is—

1. A supporting-stand of the character described, consisting of a supporting-ring having a series of tapering sockets, and a series of outwardly and radially projecting sleeves or bearings, in combination with vertical legs, each having a tapering head to fit in one of said sockets, radial supporting-arms in said bearings, and set-screws for securing said heads in said sockets and said arms in said sleeves.

2. A supporting-stand of the character described, consisting of a supporting-ring having a series of tapering sockets, and a series of outwardly and radially projecting sleeves or bearings, in combination with radial arms secured in said sleeves, and extensible legs, each having a tapering head with grooves, and set-screws adapted to enter said grooves and lock the heads in said sockets.

In testimony whereof I have signed my name to this specification, in the presence of two subscribing witnesses, on this 16th day of April, A. D. 1896.

PAUL J. BROWN.

Witnesses:
MARCUS B. MAY,
C. W. MAHAN.